United States Patent [19]

Eichelberger et al.

[11] 4,296,296

[45] Oct. 20, 1981

[54] CONTROLLABLE-DUTY-CYCLE POWER SUPPLY FOR MICROWAVE OVEN MAGNETRON AND THE LIKE

[75] Inventors: Charles W. Eichelberger; Rudolph A. Dehn, both of Schenectady; Robert J. Wojnarowski, Clifton Park, all of N.Y.

[73] Assignee: General Electric Company, Schenectady, N.Y.

[21] Appl. No.: 66,300

[22] Filed: Aug. 13, 1979

[51] Int. Cl.³ .............................................. H05B 6/66
[52] U.S. Cl. ...................... 219/10.55 B; 307/252 Q; 323/237; 328/259; 328/267; 315/105; 331/87; 361/56
[58] Field of Search ............ 219/10.55 B; 307/252 R, 307/252 B, 252 Q, 297, 239; 328/259, 261, 267; 315/105; 331/86, 87; 323/225 C, 24, 8, 36, 60; 361/1, 56

[56] References Cited

U.S. PATENT DOCUMENTS

| | | | |
|---|---|---|---|
| 3,883,782 | 5/1975 | Beckwith | 307/252 B X |
| 3,939,319 | 2/1976 | Tamano et al. | 219/10.55 B |
| 4,001,537 | 1/1977 | Burke et al. | 219/10.55 B |
| 4,012,617 | 3/1977 | Burke et al. | 219/10.55 B |
| 4,052,624 | 10/1977 | Hamstra | 307/252 B |
| 4,055,793 | 10/1977 | Bartlett | 323/24 X |

Primary Examiner—Richard R. Kucia
Assistant Examiner—Philip H. Leung
Attorney, Agent, or Firm—Geoffrey H. Krauss; James C. Davis; Marvin Snyder

[57] ABSTRACT

A power supply for controlling the duty-cycle of a microwave oven magnetron and the like power-energizing load, includes a parallel combination of a non-linear resistance element, such as a varistor and the like, and a gateable semiconductor switching device, such as a triac and the like, in series with a power supply voltage-doubler diode, connected in parallel across the magnetron. The flow of current through the magnetron is substantially reduced or prevented when the semiconductor switching device is gated to an "off" condition and is substantially enabled to a normal current flow value when the semiconductor switching device is gated to an "on" condition, typically by high frequency squarewaves provided at the gate electrode.

1 Claim, 10 Drawing Figures

PRIOR ART Fig. 1b

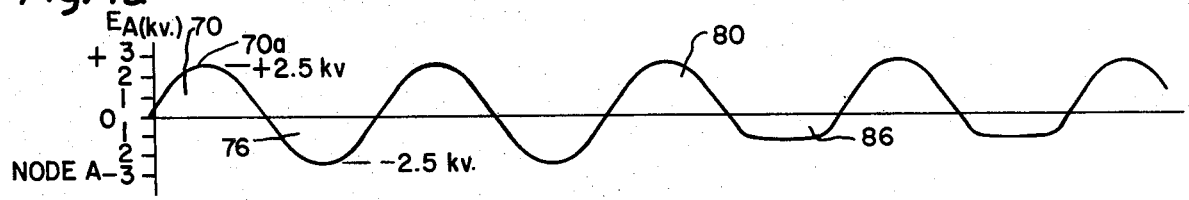
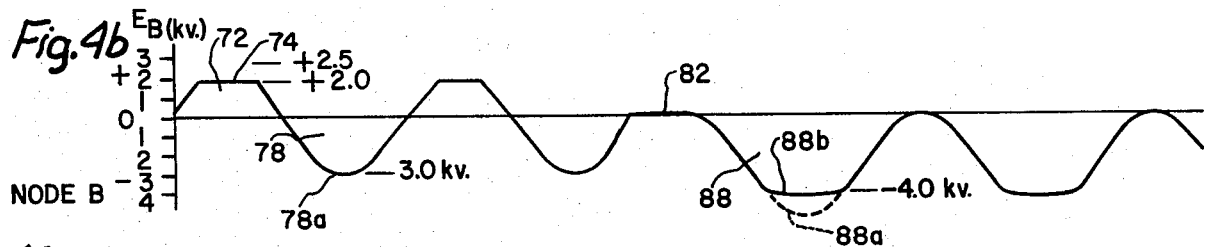
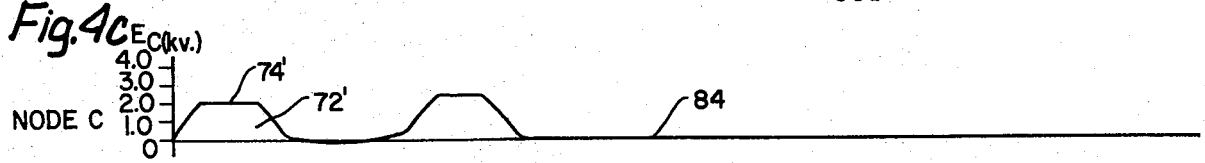
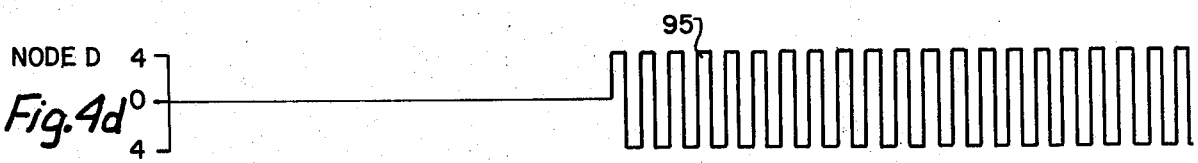
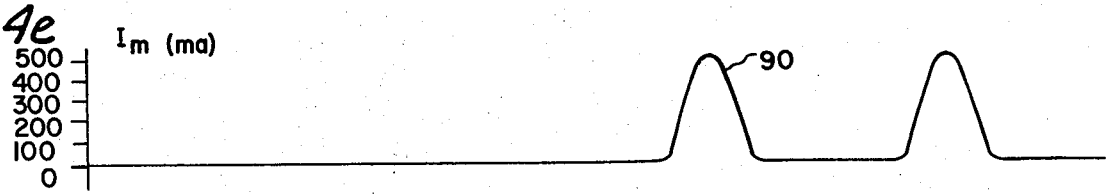
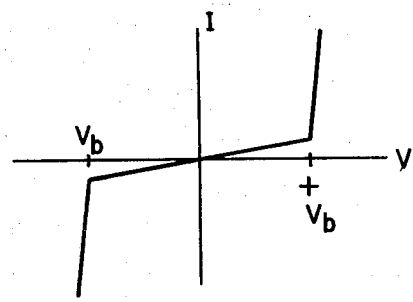

CONTROLLABLE-DUTY-CYCLE POWER SUPPLY FOR MICROWAVE OVEN MAGNETRON AND THE LIKE

BACKGROUND OF THE INVENTION

The present invention relates to power supplies and, more particularly, to a novel power supply circuit for controlling the duty-cycle of and, hence, the magnitude of current flowing through, and power generated by, a magnetron microwave generator in a microwave oven and the like power-consuming loads.

In microwave ovens and the like, wherein the amount of power supplied, such as the microwave power supplied by a magnetron and the like generators, to a load must be varied to facilitate different power-consumption schedules, such as the different cooking schedules requiring differing amounts of microwave power, it is desirable to be able to energize the generator, e.g. the oven magnetron, to the power-producing condition with a variable duty cycle. To prevent abnormal wear of mechanical components utilized to switch primary power to the power supply transformer, it is desirable to have the power supply transformer remain in the energized condition throughout the power-supplying interval, and to control the percentage of time, during each unit of time, during which the generator is enabled to provide energy to the load, e.g. the contents to be heated in the microwave oven.

BRIEF SUMMARY OF THE INVENTION

In accordance with the invention, a controllable-duty-cycle power supply for connection between a sinusoidal power source and a power-consuming load, such as a microwave oven magnetron and the like, includes a capacitance connected in series between the source and the load, and, in parallel connection across the load, a voltage-doubler diode in series with the parallel combination of a gateable semiconductor controlled-switching element and a non-linear resistance element. The breakdown, or hold-off, voltage of the semiconductor switching device is greater than the breakdown-voltage rating of the non-linear resistance element. Means, such as pulse transformers, optical couplers and the like, couple a high-frequency square-wave signal from gate circuitry to the gating electrode of the gateable semiconductor switching device to cause the switching device to provide a low resistance path between the cathode of the voltage-doubler diode and a common connection of the load, when it is desired to provide power to the load. The non-linear resistance device prevents the power supply output voltage from exceeding the minimum voltage required to cause substantial flow of current to the load, when the parallel semiconductor device is not gated to the conductive condition.

Accordingly, it is an object of the present invention to provide novel circuitry for controlling the amount of power applied to a controllable load from a power source.

This and other objects of the present invention will become apparent upon consideration of the following detailed description, when taken in conjunction with the figures.

BRIEF DESCRIPTION OF THE DRAWINGS

FIGS. 1a and 1b are schematic diagrams of prior art circuitry for controlling the duty-cycle of current applied to a microwave oven magnetron;

FIG. 3a is a graph illustrating the voltage-current characteristics of the non-linear resistance element utilized in the circuit of FIG. 3; and FIGS. 4a-4e are a set of coordinating graphs illustrating waveforms found at various points within the power supply circuit of FIG. 3 and useful in understanding the operation thereof.

DETAILED DESCRIPTION OF THE INVENTION

Figure 1A:
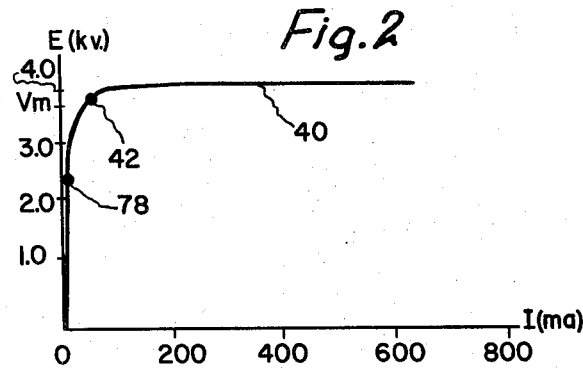

Referring initially to FIGS. 1a and 1b, prior art apparatus 10 and 10' for controlling the duty cycle of a magnetron 12, as used in microwave ovens, and the like loads, is shown. In microwave ovens, it is often desirable to have magnetron 12 generate an energy level other than the full energy level available, for certain cooking purposes. For example, in microwave oven defrosting cycles, or in the cooking of food items such as souffles and the like, the required average power is less than the full average power available from magnetron 12. The need for a reduced average power level is due to the fact that the microwave energy actually penetrates only a short distance into the food and the majority of the heating of the food, i.e. cooking, is done by thermal conduction thereafter. Thus, the introduction of too great an amount of microwave energy will result in undesirable temperature gradients in the food such that one portion of the food receives too much energy and is therefore overcooked, while other portions of the food receive insufficient amounts of energy and are undercooked. It is known that the solution to this problem is to modulate the energy from the microwave power source, typically by adjusting the duty-cycle of the microwave energy generator, i.e. turning off the energy-generating magnetron for lesser or greater portions of each of a succession of small time intervals, to respectively increase or decrease the average amount of heating energy supplied to the food in the oven. Typically, a relatively short duty-cycle time interval, on the order of one second, is required so that foods which require short cooking times can still be cooked at reduced power settings.

In a first prior art circuit 10 (FIG. 1a), the anode 12a of the magnetron is connected to electrical ground potential, while the magnetron filament 12b is connected across the secondary 14a of a filament transformer 14 having its primary winding 14b receiving the power line potential $V_P$. A separate high voltage transformer 15 has its primary winding 15a controllably connected across the line potential $V_P$ and has its high-voltage secondary winding 15b connected to a voltage-doubler circuit 16 including a series capacitance 18, connected from one end of secondary winding 15b to the junction of one end of filament transformer secondary winding 14a and one side of magnetron filament 12b. A voltage-doubler diode 20 has its anode connected to the junction between capacitor 18, filament transformer winding 14a and magnetron filament 12b. The cathode of diode 20 is connected to the remaining end of high voltage transformer secondary winding 15b, which is connected, via ground, to the magnetron anode 12a.

A gateable semiconductor device 25, such as a triac and the like, has its cathode-anode circuit in electrical series connection with the high voltage transformer primary winding 15a. The controllable semiconductor switching device 25 has a control electrode 25a, such as the gate electrode on a triac, at which a control voltage, with respect to the voltage at the cathode 25b of device 25, is impressed by a gate circuit 28.

In operation, the presence of line potential $V_P$ continuously energizes filament 12b of the magnetron. When microwave energy is to be generated, a suitable gate signal is made available at control electrode 25a, with respect to cathode 25b, to turn the triac 25 to its conducting state, whereby the high-voltage transformer primary winding 15a is connected across the power line. A high-voltage sinusoidal signal appears across high-voltage transformer secondary winding 15b and voltage doubler 16 operates in known manner to generate a D.C. voltage at magnetron filament 12b. The voltage is of polarity and magnitude sufficient to cause pulses of current to flow through the magnetron and generate microwave energy. In the absence of a control signal at control electrode 25a of at least the required magnitude, triac 25 is in a non-conductive state, whereby the transformer primary winding 15a is effectively disconnected from line potential and high voltage does not appear across the magnetron; current does not flow and substantially no microwave energy is generated. By establishing the duty-cycle of the control signal at control electrode 25a, i.e. the amount of time during which a signal is present to render triac 25 in the conducting state, with respect to the total time interval during which a sequential pair of conductive and nonconductive states occur, the amount of power generated by the magnetron, in any chosen time interval, is controlled. The triac, however, must switch the line voltage (typically on the order of 110 volts A.C. at about 15 Amperes). The highcurrent triac is not only relatively expensive, but also requires a heat sink. Additionally, at each initial turn-on of the triac, the transformer appears to be a significant inductive load, as no current is then flowing in the magnetron. The inductive load phenomenon requires that the gating pulses applied between control and cathode electrodes 25a and 25b be applied thereto with a 90° phase shift with respect to the zero crossings of the A.C. line potential. After a high voltage is applied to the magnetron, an oscillation commences, the transformer is now significantly loaded and the primary winding appears to the triac as a resistive load. The gating pulses must now be shifted back toward a 0° phase difference with the zero crossing of the A.C. line, which requires complex gating of (and complex gating circuitry for) of the triac. It will be seen that a separate filament transformer must also be used to avoid turning off the filament of the magnetron whenever the high voltage is temporary and periodically turned off. This separate filament transformer adds significant cost to the overall system.

Referring now to FIG. 1b, a second prior art circuit utilizes a single transformer 30, having a single primary winding 30a connected to the A.C. line and having a filament secondary winding 30b connected to the magnetron filament 12b. A high-voltage secondary winding 30c of the transformer is connected to a high-voltage doubler circuit 16', comprised of series capacitor 18' and voltage-doubler diode 20'. The voltage-doubler output, at point 32, is connected to the magnetron filament via a high-voltage switch means 35, such as a high-voltage reed relay and the like. The reed relay 35 requires a driving coil 37, which receives a flow of activating coil current I from a relay drive circuit 39.

In operation, if relay drive circuit 39 does not provide coil current I, the normally-open reed relay 35 does not couple the high voltage, which is continuously present at voltage-doubler output 32, to the magnetron and no microwave energy is generated. When relay drive circuit 39 provides a coil current I of sufficient magnitude, relay switch 35 is closed, coupling the high voltage from the doubler power supply across magnetron 12 and causing microwave energy to be generated. By controlling the duty cycle, i.e. the proportion of the time during which switch 35 is closed to the total time during which the power supply is energized, the average amount of microwave energy is controlled.

At present, reed relays which can switch the high voltage levels involved, even at relatively low currents, are relatively expensive. Additionally, the reed relay driving coil 37 must be isolated from the high voltage being switched by reed relay 35 and must be so isolated in a safe manner to prevent electrical safety hazards to the user of the microwave oven.

Figure 2:
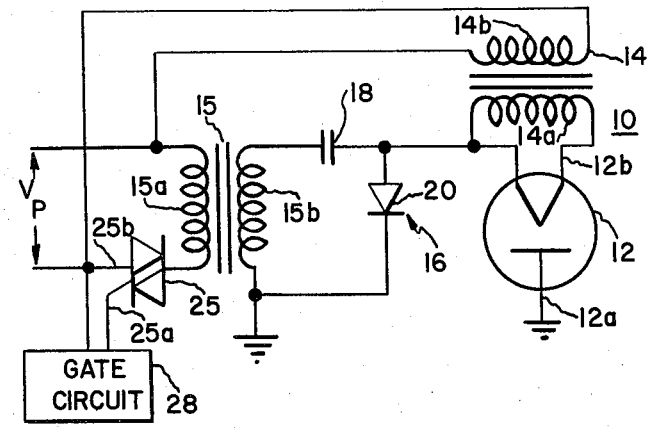
FIG. 2 is a graph illustrating the voltage-current characteristics of the controllable magnetron load.
Figure 2:
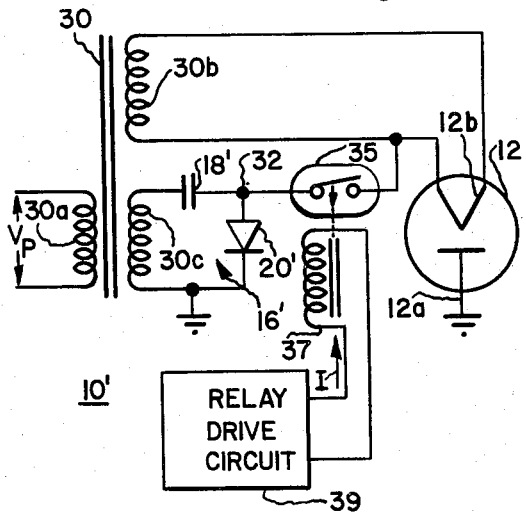

Referring now to FIG. 2, the current-voltage characteristic of a typical magnetron 12, utilized in a microwave cooking oven, is illustrated. The magnetron curve 40 illustrates that for voltages E, across the magnetron, less than some minimum voltage $V_m$ at point 42 on curve 40, the anode current $I_m$ of the magnetron is basically the leakage current thereof. Only when the minimum voltage $V_m$ is exceeded does the magnetron commence oscillation, with appreciable flow of anode current and production of microwave energy. Thus, if the filament-to-anode voltage E is controlled to be less than the minimum voltage $V_m$, microwave energy is not produced, while a relatively small increase in voltage E, whereby voltage E is greater than the minimum voltage $V_m$, causes appreciable current flow and microwave power generation.

Referring now to FIGS. 3, 3a and 4a-4e, a presently preferred embodiment of our novel controllable power supply 50, for controlling the power output of magnetron 12', includes power transformer 30' having its primary winding 30a' connected to line potential $V_P$. The filament secondary winding 30' is connected to magnetron filament 12b', whereby the magnetron filament is continuously energized as long as the microwave oven is in operation and line potential is applied to primary winding 30a'. A high-voltage secondary winding 30c' is connected between electrical ground 52 and a first power supply node A. A voltage-doubler capacitor 18" is connected between node A and an output node B of the controlled-duty-cycle power supply. A voltage-doubler diode 20" has an anode electrode connected to node B and a cathode electrode connected to another node C. One side of magnetron filament 12b' and one end of filament winding 30b' are also connected to node B.

In accordance with the invention, between node C and the high-voltage winding return (connected to ground 52) there is connected, in electrical parallel connection, a non-linear resistance element 55, such as a GEMOV$^R$ metal-oxide varistor and the like, and a controllable semiconductor switching device, such as a silicon controlled rectifier (SCR) 57 and the like. Non-linear resistance element 55 has a current-voltage characteristic as shown in FIG. 3a. Device 55 appears as a relatively high resistance for voltages, of both polarities, thereacross less than some breakdown-voltage $V_b$ thereof. When the voltage, of either polarity, across device 55 exceeds the breakdown voltage $V_b$, the device appears to have a relatively low resistance and appreciable flow of current therethrough is facilitated. Semiconductor switching device 57 has an anode electrode 57a connected to node C, at which terminal one lead of non-resistance element 55 is connected; a cathode electrode 57b is connected to the remaining lead of non-linear resistance element 55 at the electrical ground connection 52, along with the return end of high voltage secondary winding 30c'; and a gate, or control, electrode 57c. The gate electrode is connected via a series resistance 59 to a control node D. A gate circuit 62 has an output 62a which is enabled responsive to the presence of a predetermined voltage at an enable input 62b thereof. The signal at gate circuit output 62a is connected across the input circuit 65a of a coupling means 65, such as a pulse transformer, optoelectronic coupler and the like, to cause the gating circuit output waveform to appear between driving node D and the cathode electrode 57b of the controllable semiconductor switching device. Coupling means 65 is utilized to isolate the high-voltage portion of the power supply from the gate circuitry portion of the power supply, whereby gate circuit 62 may be operated at relatively low voltage, without harm from high-voltage phenomenon.

Figure 3:
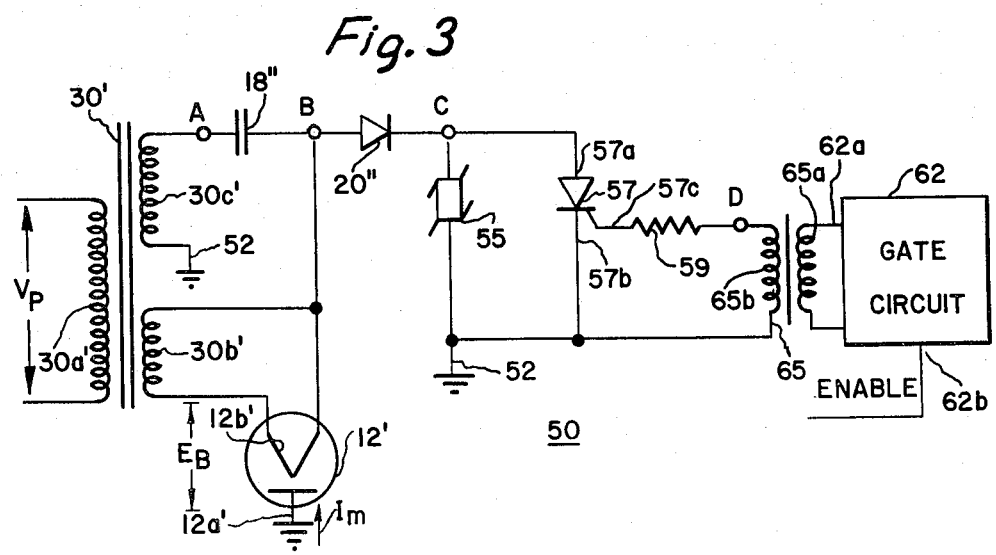
FIG. 3 is a schematic diagram of the presently preferred embodiment of a novel controllable-duty-cycle power-supply and of the load theron, in accordance with the princples of the present invention.

Referring now to FIGS. 2, 3, 3a and 4a–4e, the controllable-duty-cycle power supply circuit 50 of FIG. 3 operates as follows: when transformer primary winding 30a' is coupled to the A.C. power means, magnetron filament 12b' is continuously energized. Simultaneously, a sinusoidal high-voltage signal (FIG. 4a) appears across power transformer secondary winding 30c', between ground 52 and node A. Illustratively, the secondary voltage at node A (all voltages with respect to ground potential) is a sinusoid having a 2.5kV. peak (5 kilovolt peak-to-peak) and a substantially zero D.C. component. The 2.5 kV. peak voltage at node A occurs when the high-voltage transformer secondary winding 30c' is relatively lightly loaded; when the secondary winding is relatively heavily loaded, the high compliance and core saturation characteristics of the high-voltage transformer (previously determined) are such that a peak voltage of reduced amplitude is produced. In this manner, there is a desirable limitation on the magnitude of the magnetron current $I_m$ which may flow from magnetron anode 12a' to magnetron filament 12b'.

Assuming initially that gate circuit output 62a is of substantially zero magnitude, there is an absence of triggering signals at the control electrode 57c of SCR 57. Accordingly, the SCR switchable semiconductor device is in a non-conductive condition. The 2.5 kV. peak voltage sinusoid at node A is coupled by capacitor 18" to node B. The positive half-cycle node A waveform 70 is first coupled to node B; for instantaneous node B voltages less than the breakdown voltage $V_b$ of varistor 55, the varistor appears as a high resistance in series with diode 20", whereby the diode does not conduct and the node B waveform is essentially the node A waveform. As the breakdown voltage of the non-linear resistance element 55 is chosen to be less than the minimum voltage $V_m$ at which oscillation commences, the magnetron does not draw more than its relatively low leakage current and output power is not produced. As soon as the node B instantaneous voltage is substantially equal to the breakdown voltage of varistor 55, diode 20" is forward biased and clamps the node B positive half-cycle voltage waveform to a level 72 set by the varistor breakdown voltage $V_b$, e.g. +2.0 kV. for a 2.0 kV. breakdown voltage varistor. As the peak 70a of the node A waveform is reached, a peak voltage, substantially equal to the difference between the peak node A voltage at peak 70a (about 2.5 kV.) and the varistor breakdown voltage, at node B clamp potential 74 (about 2.0 kV.) is stored across capacitor 18", e.g. during the positive half-cycle of the high voltage sinusoid, with controllable switching device 57 in the non-conducting condition, capacitor 18" is charged to a voltage of about 500 volts in the illustrative example.

During the negative half-cycle 76 of the node A high-voltage sinusoid, the voltage at node B is equal to the instantaneous node A voltage minus the voltage stored across capacitor 18". Accordingly, the negative half-cycle 78 of the node B voltage reaches a peak, at point 78a, of about 3.0 kV. in the example. For a negative voltage at node B, diode 20" is reverse biased, even if the peak node B voltage exceeds the non-linear resistance element breakdown voltage; accordingly, current does not flow through the diode. The peak voltage at output node B, e.g. 3.0 kV., is less than the minimum voltage $V_m$, e.g. about 3.8 kV. required to start oscillation in magnetron 12', the magnetron only draws leakage current and microwave cooking power is not generated. Thus, the magnetron is controlled, by the presence of a non-conducting semiconductor switching element 57, to the off condition.

Assuming now that a suitable signal appears at the enable input 62b of gate circuit 62, gate circuit output 62a is enabled to provide a substantially square-wave waveform at a frequency at least two orders of magnitude greater than the A.C. line frequency, e.g. about 30 KHz. in the illustrated embodiment. The high-frequency square-wave is coupled to the output of coupling means 65, between driving node D and ground connection 52. The driving waveform, between the gate electrode 57c and the cathode electrode 57b of the gateable semiconductor switching device, has an amplitude predeterminately selected to cause SCR 57 to be in the conducting condition. The relativey high-frequency square-wave, which actually has somewhat rounded corners due to the attenuation of high-frequency components thereof during coupling through coupling means 65, maintains the switchable semiconductor element 57 in a continuously conductive condition, as the frequency of the control waveform is, as previously mentioned, at least two orders of magnitude greater than the frequency of the sinusoid applied to node A of the controllable power supply.

During the positive half-cycle 80 of the node A waveform, diode 20" is forward biased, whereby a small impedance exist between nodes B and C. The small impedance of the conductive SCR 57 appears between node C and the remaining end of the high-voltage winding, at ground connection 52. Accordingly, node B is maintained substantially at ground potential and the entire peak positive voltage across secondary winding 30C' appears at node A and across capacitor 18". Thus, the node B voltage, at 82, and the node C voltage, at 84, are both substantially equal to zero volts during positive halfcycle 80 of the node A voltage.

During the negative half-cycle 86 of the node A voltage, the instantaneous voltage at node B is equal to the instantaneous node A voltage minus the voltage to which capacitor 18" was previously charged, e.g. $E_B = E_A - 2.5$ kV. in the example. As the instantaneous voltage 88 at node B is negative, diode 20" is reversed biased and the node B voltage eventually reaches the minimum voltage $V_m$ required across magnetron 12' for commencing oscillation and generation of microwave power therein. The load (magnetron 12') now draws relatively large amounts of magnetron current $I_m$. Normally, the power supply output voltage $E_B$, at node B, would reach a negative peak voltage 88a equal to the peak-to-peak voltage (twice the peak voltage) of the node A sinusoid, e.g. about 5.0 kV. in the example. However, the substantial increase in magnetron current $I_m$, resulting in the current pulse 90 drawn by the load magnetron, coupled with the leakage inductance and core saturation effects of the transformer, as well as the discharging of capacitor 18", effectively clamps the power supply output voltage $E_B$, across the magnetron, to a voltage level 88b of about 4.0 kV. while the magnetron is drawing appreciable amounts of load current. Thus, during a portion of the negative half-cycle of the high-voltage sinusoid, the magnetron current increases to a peak value, e.g. about 500 milliamperes in the example, and appreciable magnetron output power is generated.

The above described cycle continues as long as the gate pulses 95 are present at node D to control the gateable semiconductor switch 57 into the conductive condition; upon removal of gate pulses 95, the gateable element, SCR 57, is returned to the non-conductive condition and the power supply output voltage $E_B$, at node B, will again not exceed a voltage equal to the peak-to-peak voltage of the sinusoid less the breakdown voltage $V_b$ of the non-linear resistance element (varistor 55). That is, the voltage with switching means 57 in the non-conductive condition is equal to, e.g. $2 \times 2.5$ kV. $-2.0$ kV., or 3.0 kV. and less than $V_m = 3.8$ kV. It will be seen that the duty-cycle of the load 12', and therefore of the power supply 50, is controllable by controlling the duty cycle of the envelope of pulses at control node D, by controlling the ratio of time, during a given time interval, during which high-frequency gating pulses are present at node D, with respect to the total time interval. Thus, gate circuit 62 may be a high-frequency multivibrator of the gated type, where the duty cycle is established by the ratio of presence and absence of the enable signal at input 62, as may be supplied by any known means, such as microcomputers, adjustable controls and the like.

It should be understood that controllable semiconductor device 57 may be any switch means, semiconductor or otherwise, which has an average current capability equal to the peak requirements of load current $I_m$, a voltage hold-off capability at least equal to the breakdown voltage $V_b$ of the non-linear resistance element in parallel electrical connection therewith, and the capability to be switched between a current-conductive condition and a current non-conductive condition. It should also be understood that the power-consuming load need not be a magnetron, but may be any power-consuming device of threshold-voltage characteristic, such that substantial current flow therethrough occurs only when the voltage thereacross exceeds some minimum voltage $V_m$. Further, any non-linear resistance device having the required breakdown voltage, may be used.

While the present invention has been described with reference to one presently preferred embodiment thereof, many variations and modifications will now occur to those skilled in the art. It is our intent, therefore, to be limited only by the scope of the appending claims and not by the details of the single embodiment discussed herein.

What is claimed is:

1. A controllable-duty-cycle power supply for connection between a sinusoidal power source and a load consuming appreciable amounts of power only if a minimum voltage applied thereto is exceeded, comprising:
    a power transformer having a primary winding connected to said source and a high-voltage secondary winding having first and second ends;
    a capacitance element connected in electrical series connection with said secondary winding first end and said load;
    means connected to the junction between said capacitance element and said load for allowing unidirectional flow of current in only one of the directions toward and from said junction;
    a non-linear resistance element in electrical series connection with said unidirectional means across said load; said non-linear resistance element providing a relatively high resistance for all voltages thereacross less than a predetermined breakdown voltage which is less than said minimum voltage and sufficiently large to prevent application of said minimum voltage to said load, and providing a relatively low resistance when the voltage thereacross exceeds said breakdown voltage;
    a gateable element in electrical parallel connection with said non-linear resistance element, said gateable element having a breakdown voltage greater than said non-linear resistance element and less than said minimum voltage and being controllable to conductive and nonconductive conditions respectively to cause the voltage across said load to be respectively at least said minimum voltage and less than said minimum voltage and said load to be respectively power-consuming and non-power-consuming responsive respectively to first and second amplitudes of a controlling signal; and
    means for providing said controlling signal of said first amplitude at a frequency at least two orders of magnitude higher than the frequency, at all phase angle relationships of each cycle, of said sinusoidal power source and with a controllable ratio of the time interval during which said relatively high frequency control signal is present to the entire time interval between successive intervals of control signal.

2. The power supply of claim 1, wherein said unidirectional means is a diode.

3. The power supply of claim 2, wherein said load is a magnetron having an anode connected to the second end of said winding and having a means, connected to the terminal of said capacitance connected to said diode, for emitting electrons; and said diode has an anode electrode connected to said junction and a cathode electrode connected to the junction of said non-linear resistance element and said gateable element.

4. The power supply of claim 1, wherein said non-linear resistance element is a varistor.

5. The power supply of claim 4, wherein the varistor is of the metal-oxide type.

6. The power supply of claim 5, wherein said gateable element is a silicon-controlled rectifier having a cathode-anode circuit directly connected across both said load and said non-linear resistance element and having a gate electrode receiving said controlling signal from said controlling signal providing means.

7. The power supply as set forth in claim 4, wherein said gateable element is a silicon-controlled rectifier having a cathode-anode circuit directly connected across both said load and said non-linear resistance element and having a gate electrode receiving said controlling signal from said controlling signal providing means.

8. The power supply of claim 1, wherein said gateable element is a silicon-controlled rectifier having a cathode-anode circuit in direct electrical power connection across both said load and said non-linear resistance element and having a gate electrode receiving said controlling signal from said controlling signal providing means.

9. The power supply of claim 1, wherein said controlling signal has a substantially square-wave waveshape.

* * * * *